March 30, 1965  T. W. KIRKCONNELL  3,175,303
EDUCATIONAL TEACHING AND GRADING MACHINE
Filed Oct. 1, 1962  3 Sheets-Sheet 1

INVENTOR.
THOMAS W. KIRKCONNELL
BY Lockwood, Woodard, Smith & Weikart
Attorneys

March 30, 1965 T. W. KIRKCONNELL 3,175,303
EDUCATIONAL TEACHING AND GRADING MACHINE
Filed Oct. 1, 1962 3 Sheets-Sheet 2
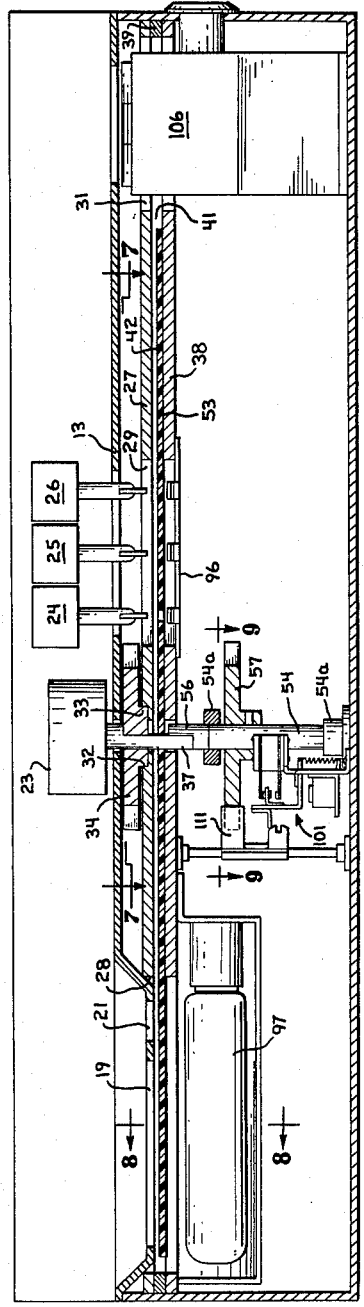
Fig. 5.
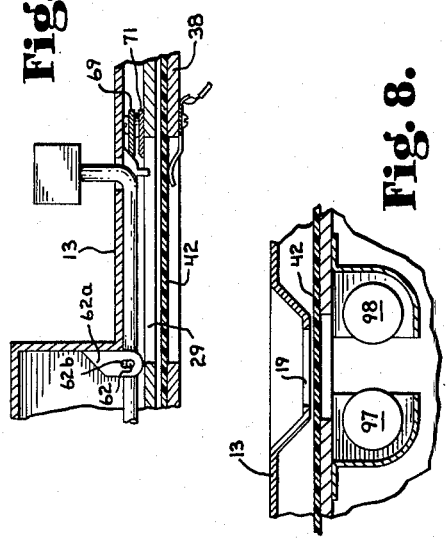
Fig. 11.
Fig. 8.
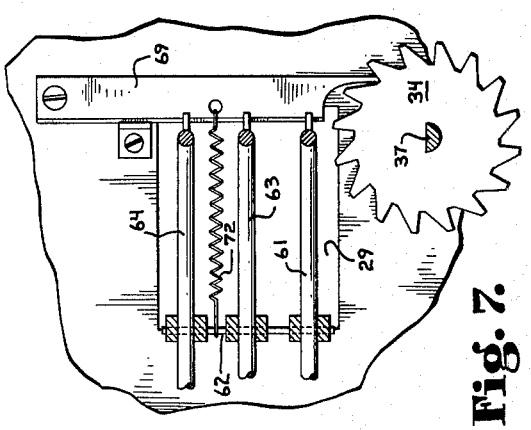
Fig. 7.
INVENTOR
THOMAS W. KIRKCONNELL
BY
Lockwood, Woodard, Smith & Weikart
Attorneys March 30, 1965     T. W. KIRKCONNELL     3,175,303
EDUCATIONAL TEACHING AND GRADING MACHINE
Filed Oct. 1, 1962     3 Sheets-Sheet 3

INVENTOR.
THOMAS W. KIRKCONNELL
BY
Lockwood, Woodard, Smith & Wickart
Attorneys

# United States Patent Office 3,175,303
Patented Mar. 30, 1965

3,175,303
EDUCATIONAL TEACHING AND GRADING
MACHINE
Thomas W. Kirkconnell, Vincennes, Ind.
(607 Greene St., Cumberland, Md.)
Filed Oct. 1, 1962, Ser. No. 227,389
11 Claims. (Cl. 35—9)

This invention relates generally to education and more particularly to a machine useful to simultaneously teach, test and grade a student.

In education, it has been found to be advantageous to teach a student as rapidly as his capacity for learning will permit. However, it is recognized that some students are more gifted for learning than are others. Accordingly, it has frequently been the case that the teaching pace established exceeds the capabilities of some students and yet does not keep pace with the capabilities of other students. Yet, it is believed by many educators that it is desirable to keep together all students within a given age range, even though it is recognized that some may have the ability to compete with older students.

As a partial solution to the dilemma, means have been devised whereby each student within a certain range of ages can be provided with educational material at a rate which closely corresponds to his or her learning rate. This is sometimes referred to as program or programmed learning and various types of teaching machines have contributed to making this concept possible.

Teaching machines heretofore devised have been many in number and many variations have appeared. Most are deficient in one or several respects which make the advance of program learning less rapid than is desired. The deficiencies include complexity, cost, bulk, and weight. As to operational deficiencies, most machines which are available are incapable of providing an easy means for the instructor to determine the progress of the student. Moreover, where they provide a testing function, they do not provide any easy means for assuring that cheating does not take place.

It is, therefore, a general object of the present invention to provide an improved teaching machine.

A further object is to provide a machine which is capable of testing the student as he learns.

A further object is to provide immediate and direct recording of the test results.

A further object is to provide a machine for achieving the foregoing objects and characterized by low-cost, small size, light weight, and ease of operation.

Described briefly, a typical embodiment of the present invention includes a case having mounted therein a movable disc bearing a plurality of groups of light transmitting means having multiple choice answers thereon. Means are provided for normally illuminating all of the answers in one group at a time and then, upon pressing a key, illuminating only the correct answer in a group. Means are also provided whereby the operation of a key corresponding to the correct answer advances a counter to indicate that the correct answer has been selected. Means are also provided to avoid repetitive operation of the correct key and also to avoid selection of the correct key subsequent to the selection of an incorrect key, thereby avoiding the possibility of cheating the machine.

The full nature of the invention will be understood from the accompanying drawings and the following description and claims:

FIG. 5 is a section taken along line 5—5 of FIG. 1.

FIG. 7 is an enlarged fragmentary section taken along line 7—7 in FIG. 5 and illustrating some details of the key locking and releasing mechanism.

FIG. 8 is an enlarged fragmentary section taken along line 8—8 in FIG. 5 and illustrating the light sources and their relationship to the viewing window and information storage disc.

FIG. 11 is an enlarged fragmentary section showing the relationship of a key and the latching bar when the key is released.

Figure 1:
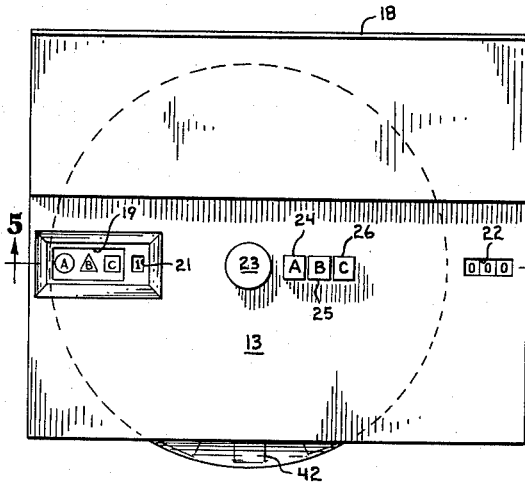
FIG. 1 is a top plan view of a typical embodiment of this invention.

Referring to the drawings, a generally rectangular case 11 is provided with a cover 12 having a top panel 13 and a front panel 14. A suitable key-operated lock 16 is provided at the lower margin of the front panel to secure the cover to the base 17 of the case. The cover is hinged at 18 for easy opening and closing when unlocked.

The top panel 13 includes a first window or "video screen" 19 through which the selection of possible answers is displayed as will become apparent. A second window 21 is provided for display of the question number. A third window 22 is provided for display of the grade obtained by the student. A frame control knob 23 is provided for moving from one group of answers for one question to another group of answers for another question. Three keys 24, 25 and 26 are provided for operation of one key for each question to select the answer believed to be correct. A first tray 27 (FIG. 5) which may be conventionally made of fiberboard, for example, is mounted in the case immediately below the top panel 13. This tray 27 has apertures 28, 29 and 31 therein to provide for the display of answers, keys, and display of grade, respectively. A well 32 is provided to receive and retain the circular boss 33 of the ratchet wheel 34 and an aperture is provided at the center of the wheel to accommodate passage of the frame control shaft 37. A second tray 38 which may be identical to the first tray if desired, for minimizing expense, is disposed in the case below the first tray 27. A suitable separator 39 is disposed between the trays to provide a space 41 therebetween to receive the information storage member which is usually in the form of a disc 42.

Figure 4:
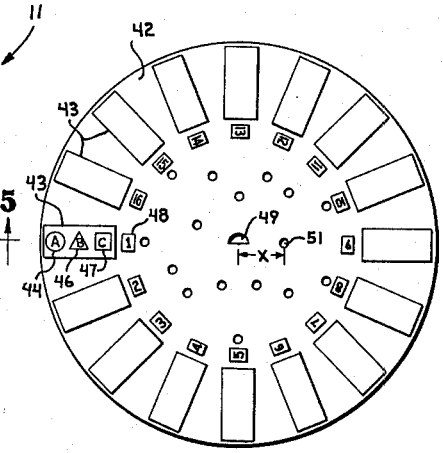
FIG. 4 is a top plan view of a typical information storage disc employed according to the present invention.
Figure 2:
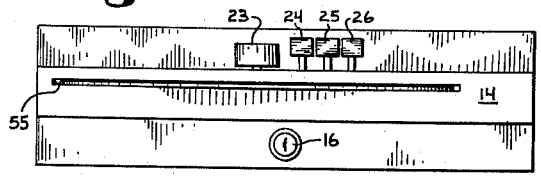
FIG. 2 is a front elevation thereof.
Figure 3:
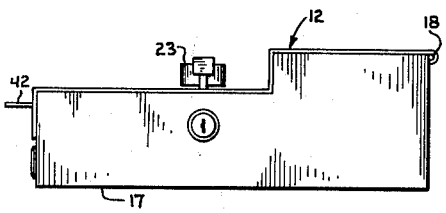
FIG. 3 is a side elevation thereof.

The information storage disc 42 (FIG. 4) has mounted therein a plurality of groups 43 of translucent cards thereon bearing multiple choice answers. For example, assume that the student has a question sheet on which question No. 1 asks which geometrical figure encloses the greatest area within a boundary of a given length. Three answers are provided on the answer card. The first answer is designated "A" and is a circle 44 in black ink. The second answer designated "B" is a triangle 46 which is printed on the card in red or magenta ink. The third answer designated "C" is a square 47 printed on the card in magenta or red ink. A block 48 is provided which includes the number of the question to be answered by one of the three choices in the group 43. The purpose of different colors of ink will become apparent as the description proceeds.

The disc 42 also includes an aperture 49 in the form of a half-moon or segment of a circle. This accommodates passage of the frame control spindle 37 which has a half-moon cross-section. Thus, by turning the knob 23, the disc can be turned.

Another aperture 51 is also provided in the disc 42 and is located at a radius "X" from the center of the disc which is at a distance corresponding to the distance of a lug 52 (FIG. 6) on the "A" key, 24. This aperture will, therefore, accommodate passage of the lug 52 therethrough in a manner and for a purpose which will become apparent as the description proceeds.

It has been found highly advantageous for the purpose of the disc to incorporate a transparent plastic disc of the type and size which can be provided with phonograph grooves on the lower face 53 thereof. This disc can, therefore, be used not only for the purposes of the present invention but also can contain additional educational material which can be derived therefrom from playing the disc on a phonograph. A shaft 54 is mounted in suitable bearings 54a in the case and has at the upper end thereof a lodestone magnet 56 or other type of permanent magnet. The shape at the upper end is made to match or mate with the frame control spindle 37 so that the shaft 54 is driven in unison with the spindle 37 as the knob 23 is turned. The magnet functions to hold the spindle and accordingly, the knob, in the proper position for operation. Of course, the knob and thereby the spindle 37 can be raised to allow removal of the disc 42 through the slot 55 in the front wall 14 of the lid and accommodate subsequent replacement with another disc. A second ratchet wheel 57 is secured to the shaft 54.

Each of the keys is mounted to a lever arm of its own as will now be described. Key 24 is secured to the arm 61 which is pivotally mounted to fulcrum on shaft 62 whereby teeter-totter action of the key arm 61 in a vertical plane is possible. The arms 63 and 64 for the keys 25 and 26, respectively, are mounted in like manner. The fulcrum shaft 62 is an electrical conductor for a purpose which will become apparent, and is mounted to the case cover 12 through insulators 62a, slots 62b being provided in the insulators for this purpose.

Figure 12:
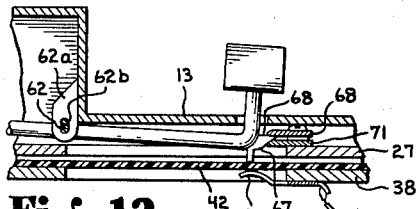
FIG. 12 shows the key actuated but its travel limited by the information storage disc, and the upper latching bar locking it in actuated condition.

Means are provided whereby the actuation or depressing of one key will prevent the depressing of the other keys. A cam member 66 (FIGS. 6, 7, 11, 12 and 13) is mounted at the rear of each of the key arms and has a cam surface 67 thereon and a locking surface 68. An upper key locking bar 69 and a lower key locking bar 71 are pivotally mounted to the case whereby the bars can be moved in a short arc against the bias of return spring 72 connected to both bars. Thus, the depression of any one of the keys will cause the curved cam surface 67 of the respective key to move the bar 69 in a short arc until the key is depressed to the point where the bar can snap back over the locking surface 68 on the key (FIG. 12). Thus, once any one of the keys is depressed, it will be held in the depressed condition until the bar 69 is moved by clockwise rotation of ratchet 34 to release the key. The function of the lower key locking bar will be described hereinafter.

Figure 6:
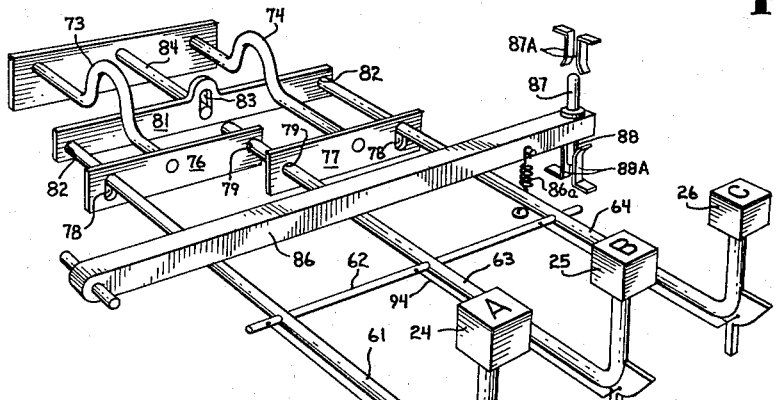
FIG. 6 is an enlarged fragmentary perspective view illustrating a portion of the key and contact assembly.

FIG. 6 shows one example of means for preventing effective simultaneous action of more than one key. Pivot bars 73 and 74 are fixed to the case and provide pivotal mounting for the short tumbler bars 76 and 77, respectively. Each of the bars 76 and 77 is provided with a slot 78 near the outer margin thereof which receives one of the key arms 61 and 64. The bars 76 and 77 are provided with apertures 79 adjacent the inboard ends of the bars and receiving the key arm 63. A long tumbler bar 81 is provided with apertures 82 adjacent the ends thereof and receiving the key arms 61 and 64. A slot 83 is provided at the center of the bar 81 and receives the pivot bar 84 which is secured to the case. The means just described are effective to prevent the depressing of either of the other two keys after one key is depressed. For example, if the key 24 is depressed, the left-hand end of the long tumbler bar 81 is raised which forces downwardly the right-hand end thereof which, in turn, holds down the end of the key arm 64 received in the aperture 82. Thus, it is seen that the key 26 cannot be also depressed. Likewise, depression of the key 24 raises the left-hand end of the short tumbler bar 76 which pivots on the member 73 thus depressing the right-hand end of the short bar 76. The key arm 63 will thereby be held down behind the fulcrum shaft 62 inasmuch as it is received in the aperture 79 and thus, the key 25 secured to the key arm 63 is held in a raised condition. It will be understood, of course, that to allow the rotational motion of the tumbler bars with respect to the key arms where required, it is most convenient to provide a circular cross section on the key arms where they pass through the apertures in the tumbler bars.

A lamp switch bar 86 is mounted above the key arms at a point between the fulcrum shaft 62 and the tumbler bars. This non-conducting bar is pivotally mounted to the case and has a pair of copper plugs 87 and 88 which are insulated from each other and are disposed in operative relation to the lamp circuits to be described. With the bar 86 in its normal condition, the plug 88 makes contact with two copper springs 88A to maintain closed a circuit through a green lamp bulb. When any of the keys is actuated, the key arm therefor is raised behind the fulcrum bar which raises the bar 86 which moves the plug 88 out of contact with the terminals 88A and moves plug 87 into contact with terminals 87A, thus opening the circuit to the green lamp and closing a circuit to a red lamp.

Figure 13:
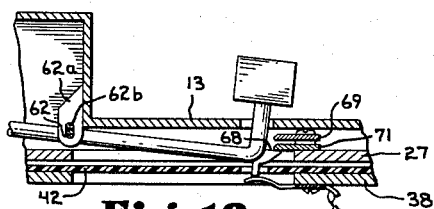
FIG. 13 is similar to FIG. 12 but shows the key in fully actuated condition where it is locked by the lower latching bar.

The lower key locking bar 71 being pivotally mounted to the case, can be moved against the bias of the return spring 72 when engaged by the cam surface 67 of any of the cam members 66. However, for it to be possible for the key to be depressed to this extent, it is necessary that the lug 52 under the key be disposed over an aperture in the disc 42 (FIG. 13). Otherwise, the key cannot be depressed this far but only far enough to be locked by the upper locking bar (FIG. 12). When a key is depressed far enough to be locked by the lower locking bar (FIG. 13), an electrical conductor mounted to the key and supplied with electricity from the fulcrum bar 62, contacts the buss bar 96. In the illustrated example, the key arms can be considered made of insulating material but the lugs 52 can be considered electrical conductors connected by a contact strip 94 to the fulcrum bar 62. The lower key locking bar is released when desired by turning the ratchet wheel 34 in the clockwise sense.

A red lamp 97 and a green lamp 98 (FIGS. 5, 8) are provided under the tray 38 and at a location offset with respect to window 19 whereby either of the lamps, when illuminated, will apply light from an angle to the group of answers exposed in the window 19 in the cover of the case. Ghost images are thereby avoided.

Figure 9:
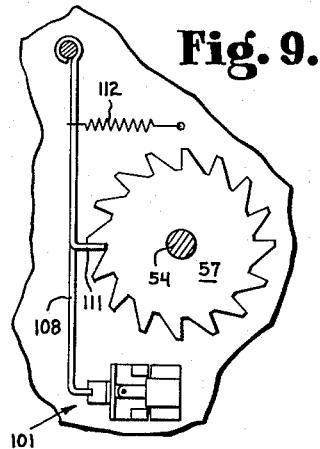
FIG. 9 is an enlarged fragmentary section taken along line 9—9 in FIG. 5 and showing a portion of the anti-cheat mechanism.
Figure 10:
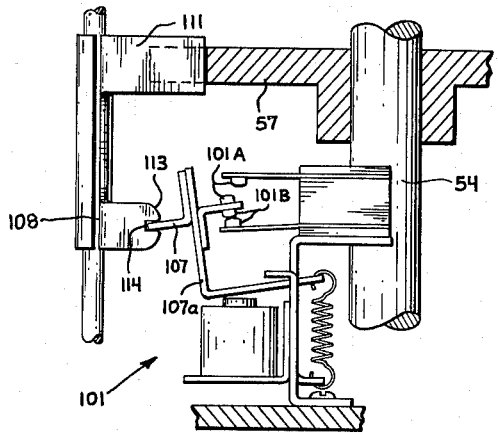
FIG. 10 is an enlarged fragmentary section.
Figure 14:
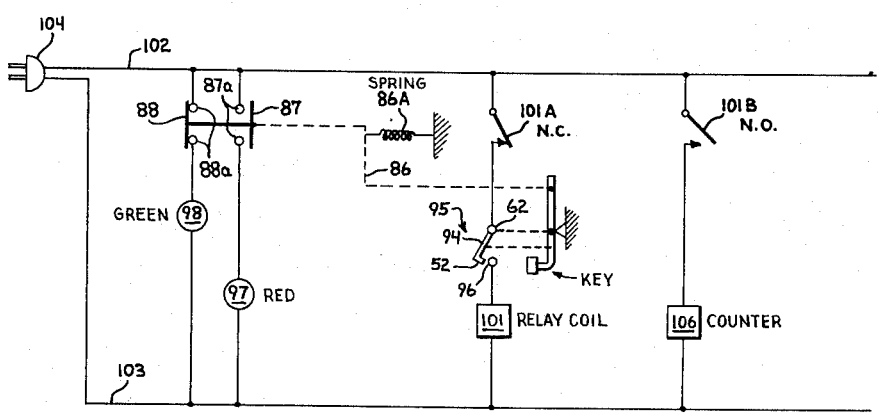
FIG. 14 is a schematic of the electrical circuit.

Referring to FIGS. 9, 10 and 14, a single-pole, double-throw relay 101 is provided and the normally closed contacts 101A thereof are in series with the key operated switch 95 including the conductor 94, lug 52 and buss bar 96 and with the relay coil 101 across the electrical supply lines 102 and 103 fed by the wall plug 104. The normally open contacts 101B of the relay are in series with the counter 106. An example of a suitable counter is the SODECO Impulse Counter Model TCeZ4E as supplied by Landis & Gyr, Inc. 45 West 45th St., New York 36, New York. This is a three digit, toggle reset, electromagnetic counter.

A lug 107 is mounted to the armature 107A of the relay. A relay locking bar 108 is pivotally mounted at 109 to the case and has a release pin 111 engaged with the lower ratchet wheel 57. The pin 111 is retained in contact with the ratchet wheel by the spring 112. A cam surface 113 and locking detent 114 are provided at the free end of the relay locking bear 108 and the lug 107 is disposed with relation thereto so that when the relay is energized, the lug will engage the cam surface 113 and move the bar 108 sufficiently for the lug to fall into the detent 114 (FIG. 10). Thus, even when the energy is then removed from the relay solenoid, the armature is locked by the bar 108. The teeth of ratchet wheel 57 are disposed to move the pin 111 and thereby the bar 108 outwardly when the wheel is rotated clockwise. This will release lug 107 from detent 114 allowing the relay armature to return to normal. It will be recognized from the foregoing that if the number of teeth on each of the ratchet wheels corresponds to the number of frames 43 or groups of answers on the discs 42, the turning of the frame control knob 23 one step to expose a new set of answers in the window 19 will be effective to release the depressed key and to release the relay.

*Operation*

In the operation of the present invention, it is assumed that the student has a set of questions on a separate sheet of paper, with the questions being numbered. Assume that question No. 1 to be answered asks which of the three geometrical figures encloses the greatest area within the least total boundary. The answer is, of course, the circle. With all of the keys released, the circuit to the counter is open, the circuit to the relay winding is open, and the circuit to the red bulb is open while the circuit to the green bulb is closed. The green bulb illuminating the disc and the group 43 of the answers causes the circle to appear in black and also the square and the triangle to appear in black inasmuch as they were printed in red ink.

The student then presses one of the three keys according to which answers he selects. Assuming he selects the correct answer and depresses the key 24, the lug 52 thereon will pass through the aperture 51 in the disc permitting the key to be locked by the lower locking bar 71. Immediately when the key is depressed, the key arm operates the bar 86 to open the green circuit and close the red circuit. This causes the two incorrect answers to disappear inasmuch as they were printed with red ink. However, the correct answer, the circle, in black ink, appears as it did before. The engagement of the contact lug 52 on the key arm with the bus bar 96 closes the relay solenoid circuit to close the counter circuit and then open the relay solenoid circuit. However, when the relay is energized, the lug 107 engages the detent 114 in the relay locking arm 108 whereby the relay is locked even though the opening of its contacts 101A deenergizes the winding.

Thus, it is seen that depression of the correct key displays the correct answer and advances the counter one increment. Thus, the numeral 1 will appear in the grade window 22. It is desirable, however, that the counter be of the type which is advanced partially when energized and completely when deenergized. In this event, the number will not appear in the grade window until the counter is deenergized. According to the present invention, the counter can only be deenergized when the lower ratchet wheel 57 is turned to release the relay locking bar 108. The turning of the lower ratchet wheel occurs only when the frame control knob 23 is turned at least one step to present in the window 19 the multiple choice answers to the next question to be answered. Accordingly, it is seen that by locking the keys and the relay as soon as a key is depressed and a correct answer is obtained, it is impossible for the student to cheat the machine by repetitively operating the key corresponding to the correct answer. He cannot, therefore, run up a high grade by repetitively pushing on the correct key in attempting to advance the counter.

Assume that, instead of pressing the correct key as previously described, a student selects the key 25. Inasmuch as there is no aperture provided in the disc 42 to receive the lug on an incorrect key, the travel of the key is limited by the disc and the key can be depressed only far enough to be locked by the upper key locking bar 69. Thus, it is impossible for the key to actuate the counter and no addition will be made to the grade. However, the fact that the key was depressed partially is sufficient to raise the arm 86 and thereby illuminate the correct answer as before. Thus, the student is instructed as he is tested and graded. Again, the student cannot release the incorrectly selected key and depress the correct key so long as he is still at question No. 2 and again he cannot cheat the machine.

In addition to providing immediate grading of the student, the present invention eliminates the necessity for the instructor to read a lot of answer material written out by the student as is required with many machines presently available. Thus, the invention achieves all of the aforementioned objects as well as having advantages in achieving objects other than those which have been expressed herein.

It should be understood that many variations can be made within the scope of the present invention. To mention several, for example, a common steel file folder box could be used for the case. Colors other than red or green could be employed or other means of obtaining light interference could be used such as, for example, the use of polarized filters and images. The term "filter" and "filtered" appears in the claims attached hereto but it should be understood to be employed in the broadest sense. For example, the use of a green glass in an incandescent bulb can be considered within the scope of the term "filtered" as used in the claims appended hereto.

It is understood that other variations in details of construction can be made, which would be within the scope of this invention. Therefore, while the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:
1. A machine comprising:
 a case,
 an information storage member movably supported by said case,
 first and second illuminating means for directing light to said storage member, each illuminating means including an electric lamp, said second illuminating means including a filtered lamp for directing filtered light to said storage member, one lamp being normally energized and the other lamp being normally de-energized,
 a plurality of keys movably mounted to said case,
 and switching means coupled to said illuminating means and operable by said keys to de-energize said one lamp and energize said other lamp to change the character of light directed to said storage member.
2. A machine comprising:
 a case,
 an information storage member mounted to move in said case,
 first and second electric lamps, each of said lamps being operable when energized, to direct light on said storage member;
 a filter cooperating with said second lamp to direct filtered light to said storage member said first lamp normally being energized and said second lamp normally being de-energized,
 a plurality of keys mounted for movement on said case, said keys and storage member being located for interference therebetween to limit movement of said keys,
 and switching means coupled to said lamps and operable by said keys to de-energize said first lamp and ener- gize said second lamp to change the character of light directed to said storage member.

3. A testing machine comprising:
a case,
a disk containing an array of translucent cards, each card bearing one bit of information in a medium having one light transmitting characteristic and each card bearing another bit of information in a medium having a different light transmitting characteristic,
a plurality of key means including keys movably mounted to said case,
first illuminating means capable, when energized, of producing light of one characteristic;
second illuminating means capable, when energized, of producing light of a characteristic different from said one characteristic;
input means for connection to a source of electrical energy;
first switch means having a first switched condition making a first circuit including said first illuminating means and said input means for energizing said first illuminating means, said first switch means having a second switched condition breaking said first circuit and making a second circuit including said second illuminating means and said input means for energizing said second illuminating means, said first switch means being normally in said first switched condition to first apply light of one characteristic to said cards to first display both of said bits of information, and said first switch means being movable from said first condition to said second condition by movement of one of said keys to then apply light of a different characteristic to said cards and thereupon display only one of said bits of information.

4. A testing machine as set forth in claim 3 and further comprising:
a plurality of tumbler bars, said bars being pivotally mounted and engageable by one of said key means and movable by said one key means to positions engaging the others of said key means and for preventing simultaneous operation of more than one key means at a time.

5. A testing machine as set forth in claim 3 and further comprising:
a manually operable member disposed at the exterior of said case and coupled to said disk for moving said disk to selectively position individual ones of said cards in a specified location,
interfering means on said key means and said disk to limit movement of all except one of said keys when one of said cards is disposed in said location, the means on said disk being arranged corresponding to said cards whereby a key which is limited by means corresponding to one card in said location is different from a key which is limited by means corresponding to another card in said location.

6. A machine as set forth in claim 5 and further comprising:
normally-open second switch means connected to said key means, said second switch means being switchable, by operation of said key means, to a closed condition momentarily making a counter control circuit including said input means and the operating coil of a counter control relay; and a counter in a circuit with switch means coupled to said relay for advancing the counter by operation of said one excepted key.

7. A machine as set forth in claim 6 and further comprising:
key locking means engageable with an actuated one of said key means to lock said one excepted key when said counter is advanced by operation of said one excepted key.

8. A testing machine comprising:

a case having a panel with first and second windows therein,
means supporting a translucent disc below said panel,
first and second electric lamps, said second lamp being normally de-energized, and said first lamp being normally electrically energized and directing light from a portion of said disc to said first window,
a filter cooperating with said second lamp and operable when said second lamp is energized to direct filtered light from a portion of said translucent disc to said first window,
a plurality of keys movably mounted in said case and extending through said second window,
a plurality of lugs, one of said lugs being secured to each of said keys and all of said lugs being disposed adjacent said disc and abuttingly engageable with said disc upon actuation of said keys to limit the travel of said keys, said disc having discontinuities at selected locations thereon and said disc being movable to various positions in said case to place one of said discontinuities in registry with one of said lugs at each position of said disc to avoid limitation of travel of a key having a lug in registry with one of said discontinuities,
switch means coupled to a source of electrical energy and to said second lamp and operable by said keys to change the character of light directed to said first window from said disc,
key interlock means movable by one key to positions limiting movement of other keys to prevent simultaneous actuation of a plurality of keys,
means operable by a key, when said key is actuated, to hold said key in actuated condition,
a knob coupled through said third window to said disc for moving said disc,
and means coupled to said knob and engageable with said key holding means for releasing said key holding means upon movement of said disc.

9. A machine as set forth in claim 8 wherein said illuminating means is offset with respect to said first window whereby light is directed at an angle from said illuminating means to the portion of said disc from which said filtered light is directed to said first window.

10. A machine comprising:
a case;
an information storage member movably supported by said case, said storage member having a plurality of light transmitting elements thereon, each of said elements having groups of information bits thereon, several of the information bits of each group being capable of transmitting light of a first character and incapable of transmitting light of a second character, and another information bit of each group being both incapable of transmitting light of said first character and incapable of transmitting light of said second character, and said storage member having a plurality of apertures therein, each of said apertures corresponding to one of said elements;
first and second illuminating means located in said case for illuminating one of said plurality of elements at a time, said first illuminating means being operable when energized to produce light of said first character, and said second illuminating means being operable when energized to produce light of said second character;
input means for connection to a source of electrical energy;
first switch means having a first switched condition making a first circuit including said input means and said second illuminating means for energizing said second illuminating means, and said first switch means having a second switched condition breaking said first circuit and making a second circuit including said input means and said first illuminating means for energizing said first illuminating means;

a plurality of keys movably mounted in said case;

a plurality of lugs, with each lug being operable by a corresponding one of said keys, and a first of said lugs being movable by its corresponding first of said keys into one of said apertures when said storage member is in a first position, and a second of said lugs being movable by its corresponding second of said keys into another of said apertures when said storage member is in a second position, said first switch means being switchable to said second condition by each of said keys, and said lugs being disposed to accommodate switching of the said switch means by a specific key only when the specific lug corresponding to said specific key has moved into one of said apertures.

11. The machine as set forth in claim 10 and further comprising:

a counter;

and means coupled to said counter and engageable by one of said lugs upon movement of said one lug into one of said apertures to initiate advance of said counter.

References Cited in the file of this patent

UNITED STATES PATENTS

| | | |
|---|---|---|
| 1,422,527 | Berger | July 11, 1922 |
| 2,092,577 | Hornung | Sept. 7, 1937 |
| 2,311,055 | Kopas | Feb. 16, 1943 |
| 2,564,089 | Williams et al. | Aug. 14, 1951 |
| 2,663,091 | Brown | Dec. 22, 1953 |
| 2,720,038 | Clark | Oct. 11, 1955 |
| 3,081,088 | Kast | Mar. 12, 1963 |